June 20, 1950 — A. MACBETH — 2,512,352
SCAFFOLDING AND LIKE CLIP OR CLAMP
Filed July 18, 1947
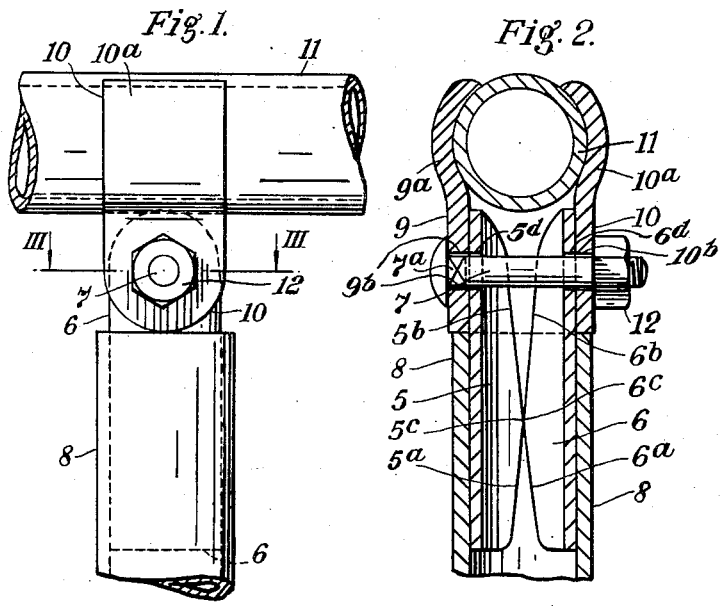
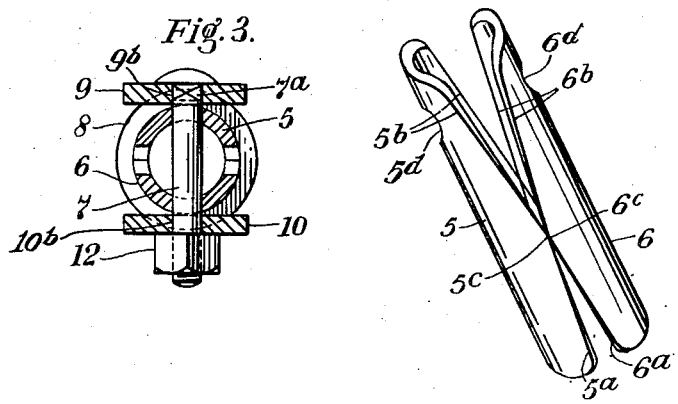
Inventor
ALLAN MACBETH
By Haseltine, Lake & Co.
Agents Patented June 20, 1950

2,512,352

UNITED STATES PATENT OFFICE 2,512,352

SCAFFOLDING AND LIKE CLIP OR CLAMP

Allan Macbeth, Altrincham, England, assignor to Mills Scaffold Company Limited, London, England, a British company Application July 18, 1947, Serial No. 761,764
In Great Britain September 28, 1938

Section 1, Public Law 690, August 8, 1946
Patent expires September 28, 1958

1 Claim. (Cl. 287—54)

1

This invention has reference to scaffolding and like clips or clamps and it has for its object to provide an improved clip or clamp for connecting together, more particularly in angular relation though if desired in parallel relation, two scaffolding or like members, one at least of which is hollow or tubular.

A scaffolding or like clip or clamp in accordance with the invention comprises two clips connected together with capability of relative angular adjustment, one of said clips being adapted to be inserted into the end of the hollow or tubular scaffolding or like member and to be expanded therein and the other clip being adapted to embrace and grip the other scaffolding or like member.

Conveniently, the two clips are pivotally connected by means of a bolt the screwing up and unscrewing of a nut on which simultaneously tightens up and releases the two clips.

In the accompanying drawings Fig. 1 is an elevation of one form of clip or clamp in accordance with the invention, Fig. 2 is a central vertical section at right angles to Fig. 1, Fig. 3 is a section plan of Fig. 1 on the line III—III therein, and Fig. 4 is a perspective view of one of the clips.

Referring to the drawings the illustrated embodiment of the invention comprises a pair of spigot parts 5, 6 shaped to fit the interior of the hollow or tubular scaffolding or like member 8 into the end of which they are adapted to be inserted for a suitable portion of their length. The adjacent faces of the spigot parts are tapered towards their inner and outer ends as at 5a, 5b and 6a, 6b to form peaks 5c and 6c at a distance from their inner and outer ends and within the scaffolding or like member 8, at which peaks 5c and 6c the two parts 5, 6 are adapted to abut and pivot one on the other when their outer ends are drawn together. Near their outer ends the spigot parts are provided with oppositely disposed holes 5d, 6d through which passes a bolt 7.

In combination with the spigot parts 5, 6 there is provided a pair of lugs 9, 10 the lower end portions of which are shaped to embrace the outer ends of the spigot parts and are adapted to abut against the end of the hollow or tubular scaffolding or like member 8 when the spigot parts 5, 6 are inserted into such member. The upper end parts of the clamping lugs 9, 10 are shaped as at 9a, 10a to embrace a second scaffolding or like member 11. The lower end portions of the lugs are provided with aligned holes 9b, 10b through which the bolt 7 also extends, one end of the bolt being fitted with a nut 12.

Upon tightening up the nut 12 on the bolt 7 the lugs 9, 10 are drawn towards each other to grip the scaffolding or like member 11 and the outer ends of the spigot parts 5, 6 are simultaneously drawn together thereby expanding their

2 inner ends to grip the interior of the hollow or tubular member 8. Thus, the spigot parts 5, 6 constitute a clip for gripping the scaffolding member 8 and the lugs 9, 10 constitute a clip for gripping the member 11, while the bolt 7 serves to pivotally connect and tighten the two clips.

The shank of the bolt 7 is preferably formed with a square part or shoulder 7a next the head and the hole 9b in the corresponding lug 9 is of similar shape to prevent the bolt from turning when the nut 12 is screwed up.

By angularly adjusting the spigot parts 5, 6 in the hollow or tubular member 8, and the lugs 9, 10 on the bolt 7, the two scaffolding or like members 8, 11 may be secured together in any desired angular relation or in parallel relation.

I claim:

A clip for connecting together two scaffolding members, at least one of which is hollow, comprising a pair of spigot parts shaped to fit by one of their ends the interior of the hollow scaffolding member, the adjacent faces of said spigot parts being shaped to form peaks at a distance between their inner and outer ends, at which peaks the two spigot parts are adapted to abut and pivot one on the other when the outer ends are drawn together, and the spigot parts being provided with aligned holes near their outer ends, in combination with a pair of lugs the lower end portions of which are shaped to embrace the outer ends of the said spigot parts and are provided with aligned holes, while the upper end parts of the lugs are shaped to embrace the other scaffold member, and a bolt passing through the said holes in the spigot parts and lugs, thereby pivotally connecting the spigot parts and lugs together, the bolt being fitted with a nut which, on being tightened, causes the lugs to be drawn towards each other, at the same time causing the outer ends of the spigot parts to be drawn also towards each other with consequent expansion of the inner ends of the spigot parts for gripping the interior of the hollow scaffolding member in which these ends are engaged.

ALLAN MACBETH.

REFERENCES CITED

The following references are of record in the file of this patent:

UNITED STATES PATENTS

| Number | Name | Date |
|---|---|---|
| 2,392,110 | Alexander | Jan. 1, 1946 |

FOREIGN PATENTS

| Number | Country | Date |
|---|---|---|
| 34,508 | Norway | Mar. 22, 1922 |
| 189,658 | Great Britain | Dec. 7, 1922 |
| 643,001 | France | May 10, 1928 |
| 647,299 | France | July 30, 1928 |